United States Patent
Honda et al.

(10) Patent No.: US 6,800,374 B2
(45) Date of Patent: Oct. 5, 2004

(54) CLEANING TAPE

(75) Inventors: Hidetoshi Honda, Miyagi (JP); Takashi Kanou, Miyagi (JP); Hitoshi Wako, Miyagi (JP); Satoshi Sekino, Miyagi (JP); Ryoichi Hiratsuka, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/171,730

(22) Filed: Jun. 14, 2002

(65) Prior Publication Data

US 2003/0031884 A1 Feb. 13, 2003

(30) Foreign Application Priority Data

Jun. 20, 2001 (JP) ..................... P2001-187229
Jun. 28, 2001 (JP) ..................... P2001-197067

(51) Int. Cl.⁷ .............. G11B 5/66; G11B 5/70; B32B 15/04; B32B 5/16; B32B 19/00
(52) U.S. Cl. ............. 428/457; 428/323; 428/336; 428/688; 428/694 T; 428/694 TP; 428/694 TC
(58) Field of Search .............. 428/694 SG, 694 T, 428/694 SL, 694 TP, 694 TC, 900, 336, 323, 457, 688

(56) References Cited

U.S. PATENT DOCUMENTS 4,540,618 A * 9/1985 Suzuki et al. ............... 428/141
5,847,905 A   12/1998 Inaba et al. ................. 360/128
6,447,936 B1 * 9/2002 Futamoto et al. ..... 428/694 TM

FOREIGN PATENT DOCUMENTS

| JP | 02126411 |   | 5/1990 |
| JP | 2-126411 | * | 5/1990 |
| JP | 05135334 |   | 6/1993 |
| JP | 7-114372 | * | 5/1995 |
| JP | 083 15327 |  | 11/1996 |

* cited by examiner

*Primary Examiner*—Holly Rickman
(74) *Attorney, Agent, or Firm*—Sonnenschein, Nath & Rosenthal LLP

(57) ABSTRACT

A cleaning tape comprising a nonmagnetic base film, an evaporated metal layer, specifically a magnetic layer or electroconductive layer, formed on the nonmagnetic base film, an inorganic protective film formed on the evaporated metal layer, and surface projections formed on the nonmagnetic base film by particles having a predetermined diameter and density. The tape has a low electric resistivity, a low head abrasion, and a sufficient cleaning effect suitable for cleaning a magnetoresistive type head.

28 Claims, 15 Drawing Sheets

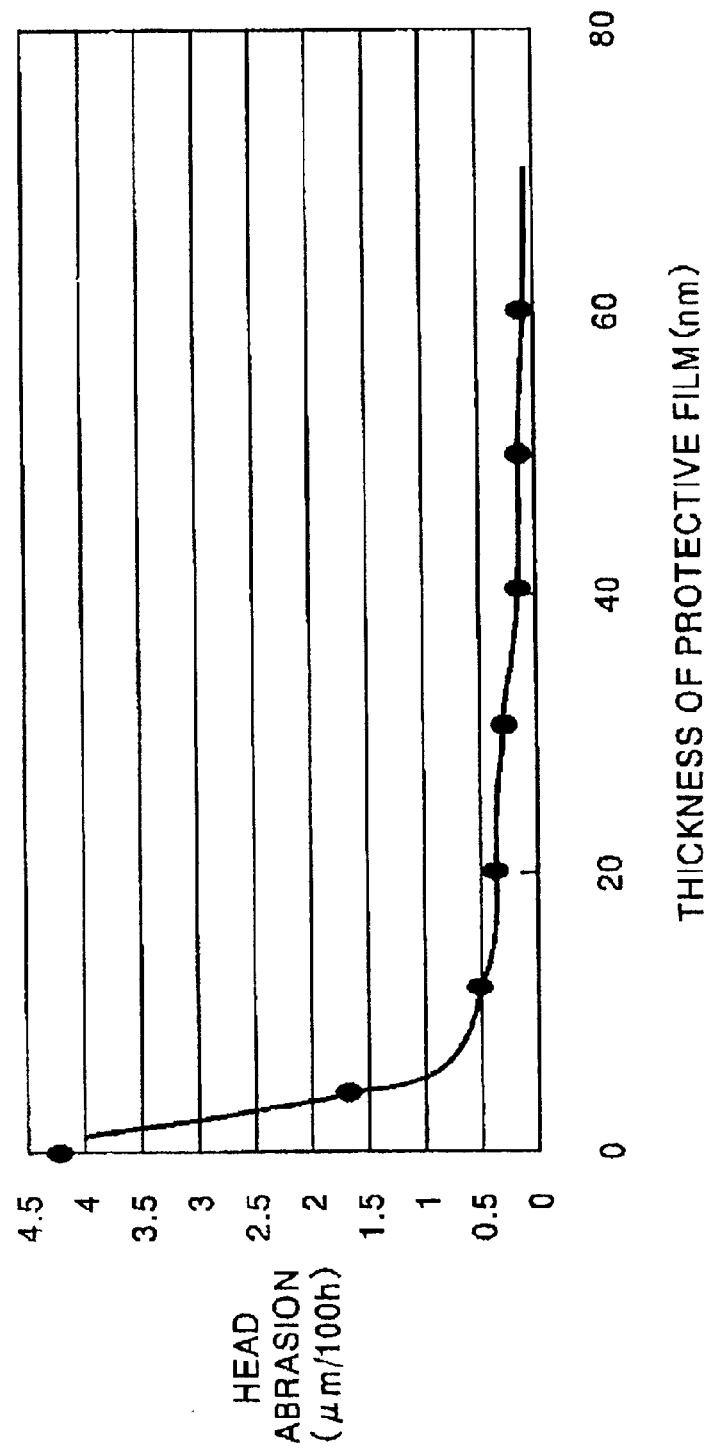

CLEANING TAPE

RELATED APPLICATION DATA

The present application claims priority to Japanese Application(s) No(s). P2001-187229 filed Jun. 20, 2001, and P2001-197067 filed Jun. 28, 2001, which application(s) is/are incorporated herein by reference to the extent permitted by law.

BACKGROUND OF THE INVENTION

1. Field of the Invention

The present invention relates to a cleaning tape for cleaning a surface of a magnetic head, particularly a magnetoresistive type head, used in a tape-type magnetic recording system, and a surface of a tape path.

2. Description of the Related Art

In the field of video tape recorders (VTR) etc., a higher recording density has become demanded for improving picture quality. The deterioration of the picture quality caused by accumulation of deposits on the sliding surface of a head, however, becomes greater along with an increase in the recording density. Therefore, cleaning tapes with a sufficient cleaning effect have become demanded.

In digital magnetic recording systems, on the other hand, magnetoresistive (MR) heads, giant magnetoresistive (GMR) heads, etc. are now being employed for realizing higher recording density. However, a magnetoresistive element such as an MR head, GMR head, or a tunnel connection-magnetoresistive (TMR) head is more vulnerable to electrostatic discharge damage compared to a conventional so-called inductive type head. Therefore, the electric resistivity of the surface sliding with the head must be kept to $1\times10^6$ $\Omega/\text{inch}^2$ or less.

Also, the magnetoresistivity of an MR head, GMR head, or other magnetoresistive head changes when the thickness of the effective surface of the head, that is, the "depth", changes. Due to this, the output power of the playback signal is influenced. Therefore, it is necessary to reduce head wear as much as possible.

As described above, in a digital recording system using a magnetoresistive type head, a cleaning tape having an electric resistivity of its magnetic surface of not more than $1\times10^6$ $\Omega/\text{inch}^2$, a low head abrasion, and a high cleaning effect has been required. However, up to now, a cleaning tape like this has not been realized by a general production technique of a coating (metal particulate) type magnetic recording medium.

Japanese Unexamined Patent Publication (Kokai) No. 8-315327 discloses a cleaning tape having a magnetic layer serving as a cleaning layer formed by metal evaporation. If forming the magnetic layer by metal evaporation, the magnetic layer does not contain any non-conductive binder or additive. Therefore, it becomes possible to lower the electric resistivity of the tape path surface.

However, when using the cleaning tape described in Japanese Unexamined Patent Publication (Kokai) No. 8-315327 for cleaning a magnetoresistive type head, the polishing power is too high and therefore the head abrasion could not be kept within an acceptable range.

Summarizing the problems to be solved by the invention, recently, there has been growing demand for improving picture quality. The electromagnetic conversion characteristics of magnetic recording media have been improved, and digital VTR systems employing narrow tapes having a width of 8 mm or less have been proposed. Also, in recording media for computers, tapes having a width of ½ inch or less have been proposed for recording and reproduction at a higher density.

At the present time, in order to secure sufficient electromagnetic conversion characteristics even with such narrow-width tape, thin film type magnetic recording media like metal evaporated tape have to be used. However, when increasing the recording density, the wavelength is shortened and the tracks are narrowed, so deposits on the head sliding surface have a greater effect on the electromagnetic conversion characteristics compared with a conventionally utilized system. Therefore, for a general user, a cleaning tape becomes a necessity when considering the maintenance of the set.

As described above, since a magnetoresistive type head has a lower resistance to electrostatic discharge damage compared to an inductive type head, unless the electric resistivity of the sliding surface is made $1\times10^6$ $\Omega/\text{inch}^2$ or less, the head element is damaged by electrostatic discharge.

Also, a magnetoresistive element obtains output power from resistivity. If the head is abraded, the resistivity changes. The playback output waveform will then become larger compared to before abrasion. If the resistivity changes more than an allowable extent, the adjustment point of the pre-adjusted head amplifier will shift and the playback waveform will become nonlinear.

To obtain a metal evaporated type cleaning tape having a sufficiently low electric resistivity of the surface sliding with the head, featuring small head abrasion, and having a sufficient cleaning effect, it is necessary to suitably control the size and density of projections on the tape surface as described in Japanese Unexamined Patent Publication (Kokai) No. 8-315327. However, up to now, the size and density of surface projections and the thickness of the magnetic layer as required for cleaning of a magnetoresistive type head have not been sufficiently investigated.

SUMMARY OF THE INVENTION

An object of the present invention is to provide a cleaning tape having a low electric resistivity, a low head abrasion, and a sufficient cleaning effect, more particularly a cleaning tape suitable for cleaning a magnetoresistive type head.

According to the present invention, there is provided a cleaning tape comprising a nonmagnetic base film, an evaporated metal layer formed on the nonmagnetic base film, and an inorganic protective film formed on the evaporated metal layer.

Preferably, the evaporated metal layer is an alloy magnetic layer mainly composed of cobalt, and the thickness of the alloy magnetic layer is about 30 nm or more.

Preferably, the cleaning tape further comprises surface projections formed on the nonmagnetic base film by particles having a diameter of 35±5 nm and a density of about $300\times10^4$ to $1500\times10^4$ particles/mm$^2$.

Alternatively, the cleaning tape further comprises surface projections formed on the nonmagnetic base film by particles having a diameter of 25±5 nm and a density of about $500\times10^4$ to $2000\times10^4$ particles/mm$^2$.

Alternatively, the cleaning tape further comprises surface projections formed on the nonmagnetic base film by particles having a diameter of 15±5 nm and a density of about $500\times10^4$ to $4000\times10^4$ particles/mm$^2$.

Preferably, the evaporated metal layer is an electroconductive layer. More preferably, the electroconductive layer comprises a nonmagnetic layer.

Preferably, the cleaning tape further comprises surface projections formed on the nonmagnetic base film by particles having a diameter of 25±5 nm and a density of about 500×10⁴ to 2000×10⁴ particles/mm².

Preferably, the electroconductive layer is a metal layer or alloy layer comprising at least one of aluminum or copper. In that case, the thickness of the electroconductive layer is about 20 nm or more.

Alternatively, the electroconductive layer is a metal layer or alloy layer comprising at least one of tungsten, molybdenum, magnesium, iron, and nickel. In that case, the thickness of the electroconductive layer is about 30 nm or more.

Preferably, the inorganic protective film comprises a carbon protective film. Preferably, the thickness of the inorganic protective film is about 3 nm to 50 nm.

Due to this, it becomes possible to lower the electric resistivity of the surface of the cleaning tape, reflect the size and density of the particles on the nonmagnetic base film on the cleaning tape surface, and control the head abrasion and cleaning effect to the optimal ranges.

BRIEF DESCRIPTION OF THE DRAWINGS

These and other objects and features of the present invention will become clearer from the following description of the preferred embodiments given with reference to the accompanying drawings, in which:

FIG. 23 is a graph of the relationship between the thickness of a carbon protective film and head abrasion in the second embodiment.

DESCRIPTION OF THE PREFERRED EMBODIMENTS

Below, preferred embodiments will be described with reference to the accompanying drawings.

First Embodiment

Figure 1:
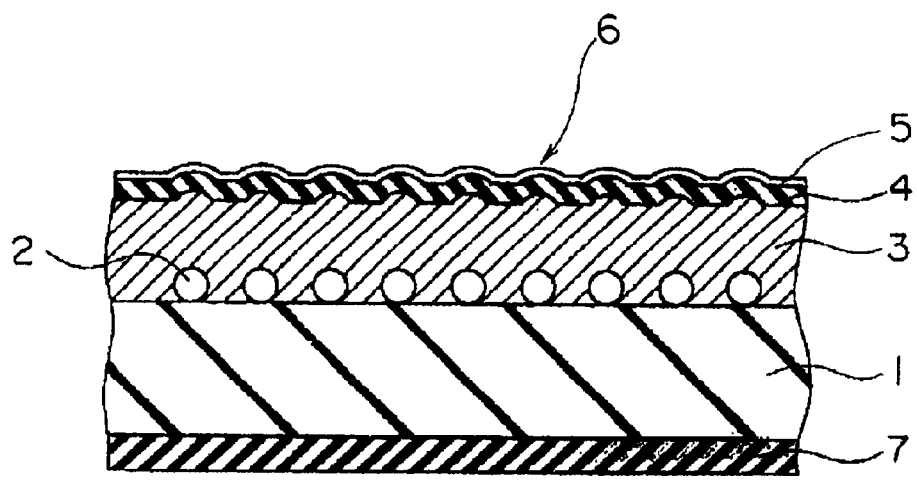
FIG. 1 is a cross-sectional view of an example of a cleaning tape of the present invention.

FIG. 1 is a cross-sectional view of a cleaning tape of the present embodiment. As shown in FIG. 1, a nonmagnetic base film 1 has particles 2 having a predetermined diameter dispersed over it by a predetermined density.

The nonmagnetic base film 1 and particles 2 have an evaporated metal layer 3 formed over them. In the present embodiment, a magnetic layer is formed as the evaporated metal layer 3. The evaporated metal layer 3 has an inorganic protective film 4 formed over it. A top coating layer 5 is formed on this film.

The surface of the cleaning tape is formed with surface projections 6 reflecting the diameter and density of the particles 2. The back surface of the cleaning tape is provided with a back coating layer 7.

As a material of the nonmagnetic base film 1, for example, polyethylene terephthalate (PET), poly(ethylene naphthalate) (PEN), polyester, or another polymer material conventionally used as a nonmagnetic base film of a magnetic tape can be mentioned.

As the material of the particles 2, for example, particles of $SiO_2$, $TiO_2$, $Al_2O_3$, $CaCO_3$ or emulsions, etc. can be used. The emulsions can be aqueous emulsions or nonaqueous emulsions. Further, a latex etc. can also be used.

As a synthetic resin composing the emulsion, for example, a thermoplastic resin composed of a homopolymer or copolymer of vinyl acetate, acrylic ester, methacrylic ester, vinylidene chloride, vinyl chloride, ethylene, styrene, etc., a thermosetting resin such as an epoxy resin, or a synthetic rubber such as a butadiene-styrene copolymer or butadiene-acrylonitrile copolymer can be mentioned, but the synthetic resin is not particularly limited.

Any other materials able to form the particles 2 having a predetermined height can also be used.

For convenience, the size of the particles 2 is expressed by the diameter when considering the particles 2 as spheres. The height of the surface projections is determined by the diameter of the particles 2.

As the magnetic layer of the evaporated metal layer 3, a metal magnetic thin film composed of an alloy comprising Co as a main component is used. As a method of forming the metal magnetic thin film, a vacuum thin film forming technique can be mentioned. Specifically, vacuum evaporation, sputtering, ion plating, etc. can be mentioned.

As the inorganic protective film 4, for example a carbon film or any other protective film usually used in a magnetic recording medium of a metal magnetic thin film type can be used. For forming the inorganic protective film 4, for example, a physical vapor deposition (PVD) system such as a sputtering system, or a chemical vapor deposition (CVD) system using vapor phase reactions can be used.

As a material of the inorganic protective film 4, in addition to carbon, $CrO_2$, $Al_2O_3$, BN, Co oxides, MgO, $SiO_2$, $Si_3O_4$, $SiN_x$, SiC, $SiN_x$—$SiO_2$, $ZrO_2$, $TiO_2$, TiC, etc. can be mentioned. A single layer film or multiple layer film of these materials formed by a vacuum thin film forming technique can be used as the inorganic protective film 4.

As means of measuring the thickness of the magnetic layer 3 and inorganic protective film 4, generally a transmission electron microscope (TEM) is employed.

In the cleaning tape of the present embodiment, the surface projections are provided due to the particles 2 and the diameters and density of the particles 2 are defined. The surface shape of the nonmagnetic base film 1 is reflected in the surface characteristics of the magnetic layer formed on the nonmagnetic base film 1. Due to this, not only is a good condition of tape running secured, but also an appropriate cleaning effect can be obtained while suppressing head abrasion.

As a method of forming the surface projections by the particles 2 on the nonmagnetic base film 1, for example, the method of adding and dispersing particles 2 having diameters 35±5 nm, 25±5 nm, or 15±5 nm into the source material (chips) of the nonmagnetic base film 1 to form the nonmagnetic base film 1 can be mentioned. When shaping the source material with the particles 2 dispersed in it, surface projections having heights corresponding to the diameter of the particles 2 are formed by the combination of the amount of protrusion of the particles 2 and the thickness of the resin coating covering the particles 2. Note that, in this case, the amount of addition of the particles 2 into the source material is adjusted so that the density of the surface projections on the nonmagnetic base film 1 falls within the range described above.

Alternatively, as another method of forming the surface projections on the nonmagnetic base film 1, particles 2 having diameters of 35±5 nm, 25±5 nm, or 15±5 nm are arranged and fixed by a binder resin etc. on the nonmagnetic base film 1 at a density within a range described above. Due to this, a nonmagnetic base film 1 having surface projections of heights of 35±5 nm, 25±5 nm, or 15±5 nm can be obtained.

When forming the magnetic layer 3 on a nonmagnetic base film 1 having surface projections as described above, the shapes of the projections are reflected on the surface of the magnetic layer 3. Therefore, cleaning tape having projections of heights of 35±5 nm, 25±5 nm, or 15±5 nm on the surface of the magnetic thin film can be obtained.

In addition, the accuracy of reflection of the projecting shapes of the nonmagnetic base film 1 on the surface of the metal thin film depends on the thickness of the metal thin film. When the magnetic layer 3 is thin, the projecting shapes are reflected on the surface of the magnetic layer 3 with a relatively high accuracy. Therefore, it is preferable that the thickness of the magnetic layer 3 be restricted.

Figure 2:
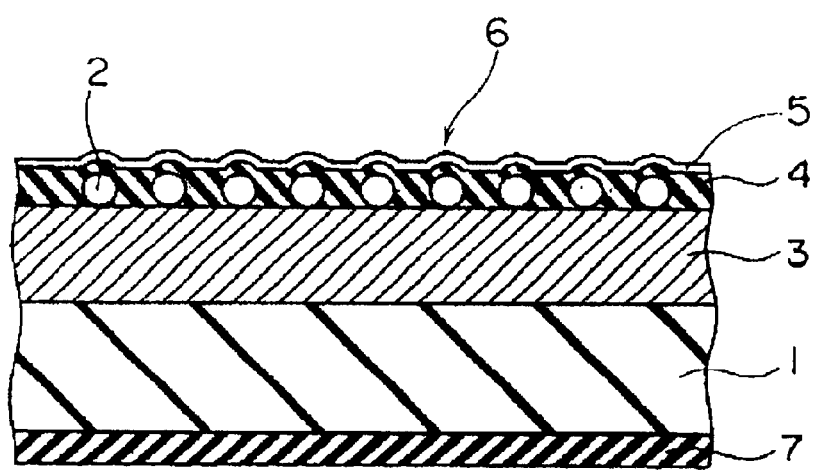
FIG. 2 is cross-sectional view of another example of a cleaning tape of the present invention.

As described above, the surface projections on the nonmagnetic base film 1 can be formed by any method so long as the projecting shapes of the nonmagnetic base film 1 are finally reflected on the surface of the evaporated metal layer. According to the methods described above, the surface projections are formed in advance on the nonmagnetic base film 1 and then the magnetic layer 3 and inorganic protective film 4 are formed. As shown in FIG. 2, however, it is also possible to use a nonmagnetic base film 1 having a flat surface and arrange the particles 2 described above on the surface of the magnetic layer 3 by a predetermined density. In this case, the particles 2 are coated with the inorganic protective film 4 to hold the particles 2 and form the surface projections.

As the method of measuring the height of the surface projections 6 of the cleaning tape, for example, the method of observing the atomic image of the cleaning tape surface by using an atomic force microscope (AFM) can be mentioned. An atomic force microscope is configured by a cantilever part shaped like a springboard with a probing tip having a small radius of curvature and a measurement system for measuring displacement of the cantilever. When a repulsive force acts between an atom at the top of the probing tip and an atom of the measured sample, the cantilever moves so the displacement is detected.

In an atomic force microscope, a laser beam is focused on the cantilever and the position of the reflected light is detected to measure the displacement of the cantilever. The sample stage (piezo translator) on which the measured sample is set is moved up or down along a Z-axis (vertical axis with respect to the sample stage) and the sample stage is scanned along X-axis and Y-axis directions (orthogonal two axes in horizontal direction with respect to the sample stage) to maintain displacement of the cantilever constant. A three-dimensional image is obtained based on the signals controlling the X-axis, Y-axis, and Z-axis.

While the fundamental configuration of the cleaning tape of the present invention is as described above, if necessary, it is also possible to provide an undercoating film between the nonmagnetic base film 1 and the magnetic layer 3, provide a back coating layer 7 at the back surface of the cleaning tape, or provide a top coating layer 5 on the inorganic protective film 4. The undercoating film, back coating layer 7, top coating layer 5, etc. can be formed in the same manner as the undercoating film, back coating layer, top coating layer, etc. provided in a usual magnetic recording medium. The method of formation is not restricted.

As the material of the top coating layer 5, for example, perfluoropolyether (PFPE) can be used. Also, as the material of the back coating layer 7, for example a mixture of a binder plus a surfactant, coupling agent, etc. can be used.

Below, the characteristics of the cleaning tape of the embodiment shown in FIG. 1 will be explained with reference to measurement results. In the examples below, a PET film was used as the nonmagnetic base film 1, the magnetic layer 3 was formed by vacuum evaporation, and the top coating layer 5 and back coating layer 7 were provided on the cleaning tape.

Figure 3:
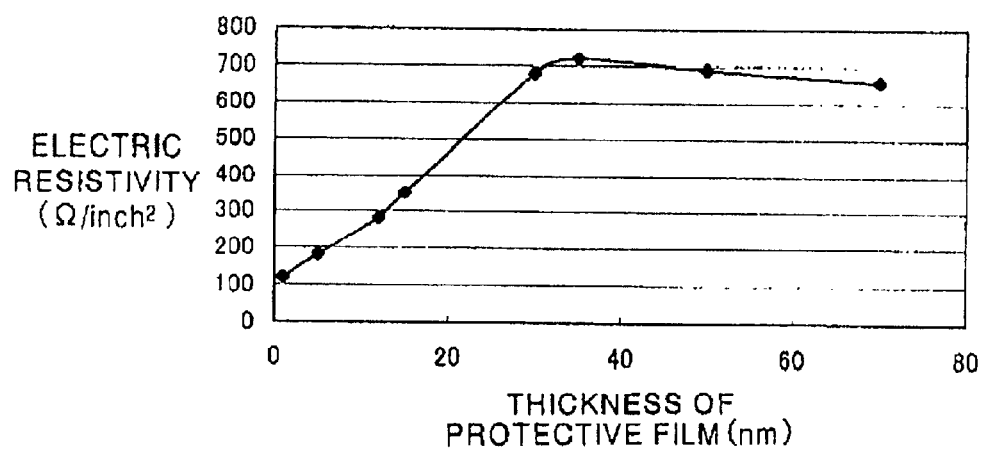
FIG. 3 is a graph of the relationship between the thickness of a carbon protective film and the electric resistivity in the first embodiment.

FIG. 3 shows the results of measurement of the thickness of a carbon protective film provided as the inorganic protective film 4 and the electric resistivity on the surface of the cleaning tape. When setting the thickness of the magnetic layer 3 to 150 nm and changing the thickness of the carbon protective film, the electric resistivity becomes maximum at a 35 nm thickness of the carbon protective film.

Figure 4:
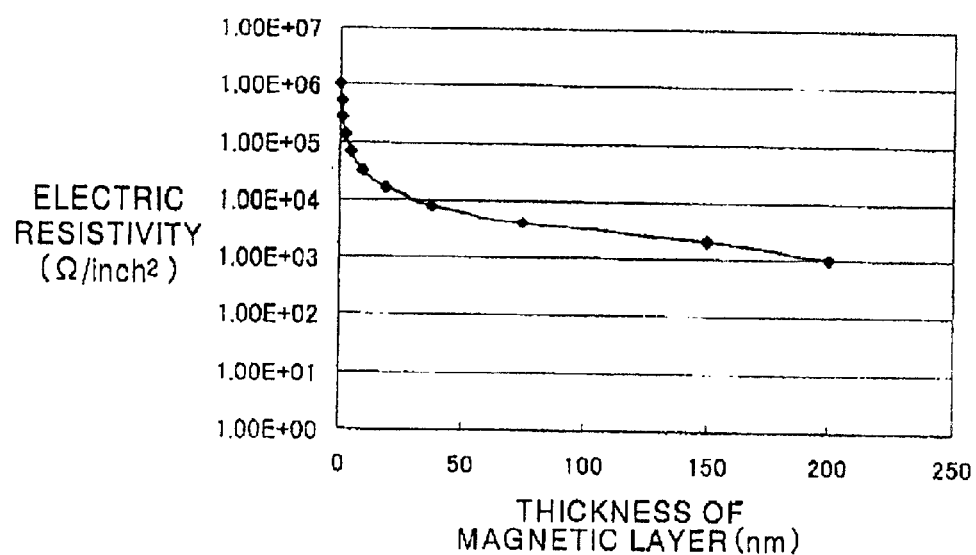
FIG. 4 is a graph of the relationship between the thickness of a magnetic layer and the electric resistivity in the first embodiment.

FIG. 4 shows the results of measurement of the electric resistivity at that thickness of the carbon protective film (35 nm) when changing the thickness of the magnetic layer 3. As shown in FIG. 4, the thicker the magnetic layer 3, the lower the electric resistivity. When the magnetic layer 3 becomes thinner than about 30 nm, the electric resistivity sharply increases. Therefore, it is found that about 30 nm or more is required as the thickness of the magnetic layer for preventing electrostatic discharge damage of the magnetoresistive head even when the thickness of the carbon protective film (35 nm) is one giving the maximum electric resistivity.

Figure 5:
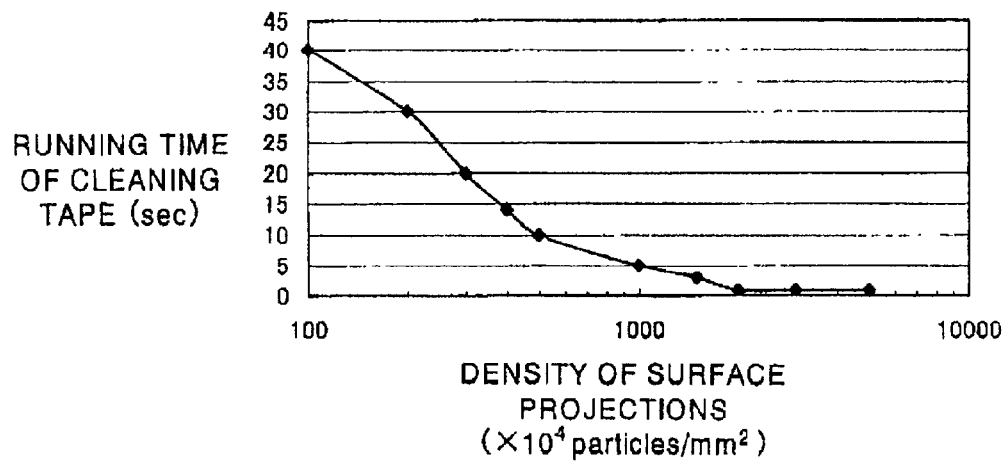
FIG. 5 is a graph of the relationship between the density of surface projections and the cleaning effect when using particles having a diameter of 35±5 nm in the first embodiment.

FIG. 5 shows the results of an investigation of the density of surface projections able to give a sufficient cleaning effect when the thickness of the magnetic layer 3 is 50 nm and the thickness of the carbon protective film is 10 nm. Particles 2 having a diameter of 35±5 nm were arranged on the nonmagnetic base film 1 to form projections on the surface of the magnetic layer. Below, FIG. 5 to FIG. 8 show results of measurement when using particles having a diameter of 35±5 nm.

The cleaning effect was judged by deliberately depositing magnetic powder etc. to prevent RF playback output from being obtained from the head and measuring a running time of the cleaning tape over the head required for restoring the RF playback output.

Specifically, first, a magnetic tape not including an inorganic protective film or a layer containing a lubricating agent and therefore easily depositing a magnetic powder, metal oxide, etc. on a head (easily shedding magnetic powder on the head) was prepared. The magnetic tape was paused on the head for about 5 minutes to allow the magnetic powder of the magnetic layer to deposit on the head. Due to this, RF playback output was prevented from being obtained from the head.

Next, the cleaning tape was run and the time until the RF playback output power recovered to ±0.5 dB from the level before deposition of the magnetic powder on the head was measured. The recommended time of use of a commercially available cleaning tape is generally 20 seconds. This was used as an indicator to determine if the cleaning tape was usable or not.

As shown in FIG. 5, when the density of the particles is $300 \times 10^4$ particles/mm$^2$ or more, the cleaning time is 20 seconds or less, so the cleaning tape can be regarded as usable. On the other hand, when the density of the particles exceeds $1500 \times 10^4$ particles/mm$^2$, the cleaning time becomes extremely short. If the optimum cleaning time becomes too short, control of the cleaning time becomes difficult and the possibility of excess cleaning arises. Therefore, according to FIG. 5, it is found that the preferable density of the particles is $300 \times 10^4$ particles/mm$^2$ to $1500 \times 10^4$ particles/mm$^2$.

Figure 6:
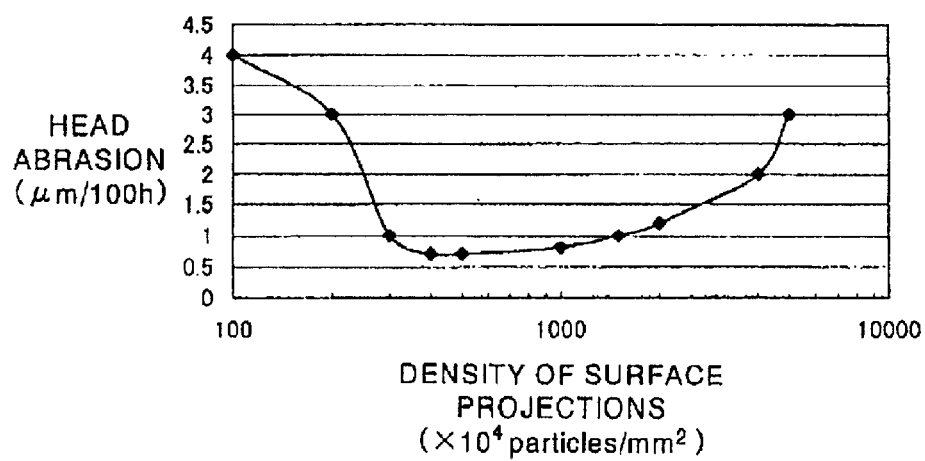
FIG. 6 is a graph of the relationship between the density of surface projections and the head abrasion when using particles having a diameter of 35±5 nm in the first embodiment.

FIG. 6 shows the result of an investigation of the relationship between the density of surface projections and head abrasion when setting the thickness of the magnetic layer to 50 nm and setting the thickness of the carbon protective film to 10 nm in the same manner as FIG. 5. As shown in FIG. 6, when the density of the particles is about $400 \times 10^4$ particles/mm$^2$ to $500 \times 10^4$ particles/mm$^2$, the head abrasion becomes minimum. The lower the density of the particles from that range or the higher the density of the particles from that range, the more the head abrasion becomes.

An acceptable range of MR head abrasion with respect to the usage time of a cleaning tape is generally considered to be 1 μm/100 h. Using this as an indicator, it can be said that the particle density giving an acceptable range of head abrasion is $300 \times 10^4$ to $1500 \times 10^4$ particles/mm$^2$.

From FIGS. 5 and 6, it is found that the density of surface projections must be kept within a range of $300 \times 10^4$ to $1500 \times 10^4$ particles/mm$^2$ for achieving both a sufficient cleaning effect and low abrasion. When the particle density becomes outside of the range described above, the balance of the cleaning effect and low abrasion cannot be maintained well.

Figure 7:
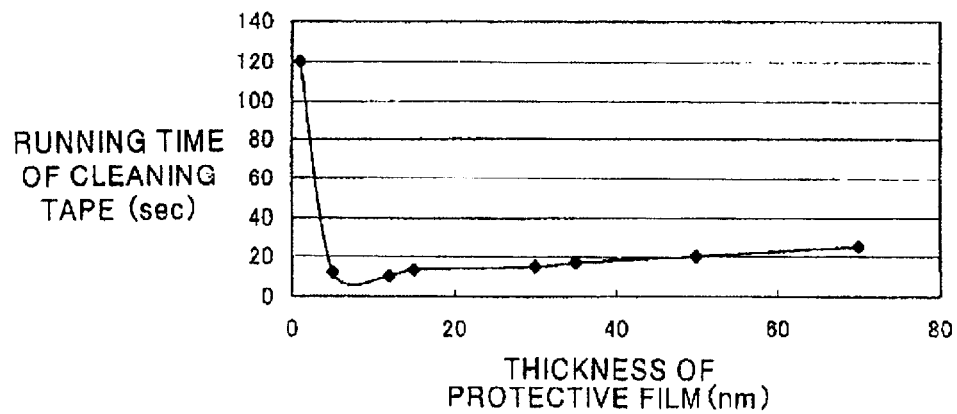
FIG. 7 is a graph of the relationship between the thickness of a carbon protective film and the cleaning effect when using particles having a diameter of 35±5 nm in the first embodiment.

FIG. 7 shows the results of an investigation of the relationship between the thickness of the carbon protective film and the cleaning effect when setting the thickness of the magnetic layer to 50 nm and setting the density of surface projections to $500 \times 10^4$ particles/mm$^2$. Based on the indicator of the cleaning time described above (20 seconds or less), it is observed that an appropriate cleaning effect can be obtained with a thickness of the carbon protection film within a range of 3 nm to 50 nm.

Figure 8:
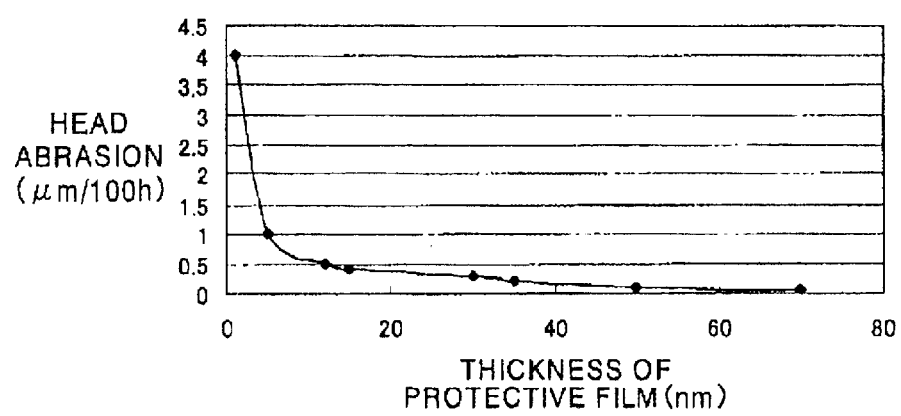
FIG. 8 is a graph of the relationship between the thickness of a carbon protective film and head abrasion when using particles having a diameter of 35±5 nm in the first embodiment.

FIG. 8 shows the results of an investigation of the relationship between the thickness of the carbon protective film and head abrasion when setting the thickness of the magnetic layer 3 to 50 nm and setting the density of surface projections to $500 \times 10^4$ particles/mm$^2$. As shown in FIG. 8, the thicker the carbon protective film, the lower the head abrasion. It is found that the head abrasion with respect to the usage time of the cleaning tape becomes within an acceptable range described above (1 μm/100 h) when setting the thickness of the carbon protective film to 3 nm or more.

From FIGS. 7 and 8, it is found that the preferable thickness of the carbon protective film is within a range from 3 nm to 50 nm for achieving both a sufficient cleaning effect and low abrasion. When the thickness of the carbon protective film becomes outside of the range described above, the balance of the cleaning effect and low abrasion cannot be maintained well.

Next, the diameter of the particles 2 was changed to 25±5 nm and measurements made under the same conditions as in FIGS. 5 to 8 described above. The cleaning effect, the acceptable range of head abrasion, etc. were judged in the same manner as the case of particles of a diameter of 35±5 nm described above. FIGS. 9 to 12 show the results of measurement when using particles having a diameter of 25±5 nm.

Figure 9:
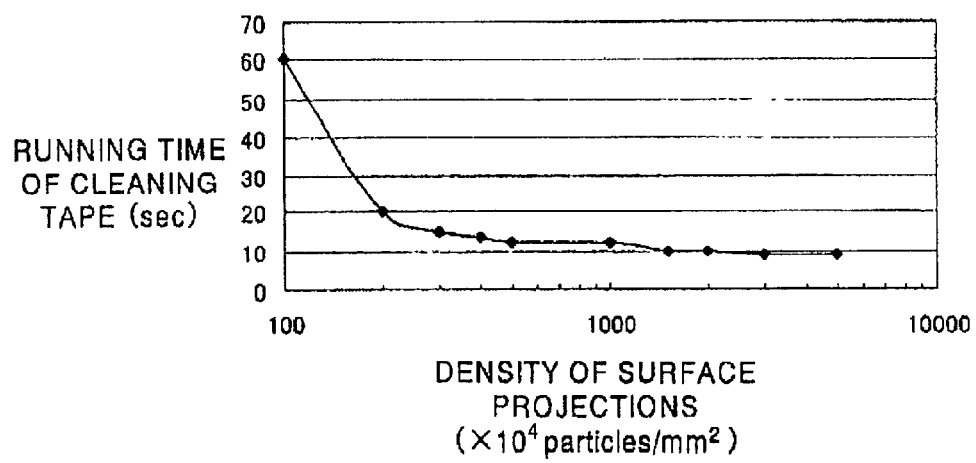
FIG. 9 is a graph of the relationship between the density of surface projections and the cleaning effect when using particles having a diameter of 25±5 nm in the first embodiment.

FIG. 9 shows the results of an investigation of the density of surface projections giving a sufficient cleaning effect when the thickness of the magnetic layer 3 is set to 50 nm and the thickness of the carbon protective film is set to 10 nm. Based on the indicator of the cleaning time described above (20 seconds or less), as shown in FIG. 9, a sufficient cleaning effect is obtained when the particle density is $200 \times 10^4$ particles/mm$^2$ or more.

On the other hand, when the density of the particles exceeds $2000 \times 10^4$ particles/mm$^2$, the cleaning time becomes 10 seconds or less. If the optimum cleaning time becomes too short, control of the cleaning time becomes difficult and the possibility of excess cleaning arises. Therefore, according to FIG. 9, it is found that the preferable density of the particles is $200 \times 10^4$ particles/mm$^2$ to $2000 \times 10^4$ particles/mm$^2$.

Figure 10:
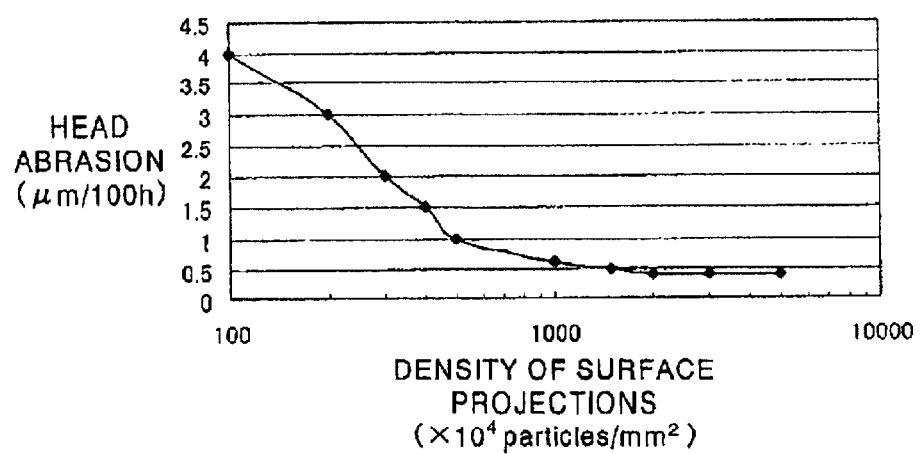
FIG. 10 is a graph of the relationship between the density of surface projections and the head abrasion when using particles having a diameter of 25±5 nm in the first embodiment.

FIG. 10 shows the results of an investigation of the relationship between the density of surface projections and head abrasion when setting the thickness of the magnetic layer to 50 nm and setting the thickness of the carbon protective film 10 nm in the same manner as FIG. 9. As shown in FIG. 10, the higher the density of the surface projections, the less the head abrasion. It is found that the head abrasion with respect to the usage time of the cleaning tape becomes within the acceptable range described above (1 $\mu$m/100 h) when setting the particle density to $500 \times 10^4$ particles/mm$^2$ or more.

From FIGS. 9 and 10, it is found that the density of surface projections must be set within a range of $500 \times 10^4$ to $2000 \times 10^4$ particles/mm$^2$ for achieving both a sufficient cleaning effect and low abrasion. When the particle density becomes outside of the range described above, the balance of the cleaning effect and low abrasion cannot be maintained well.

Figure 11:
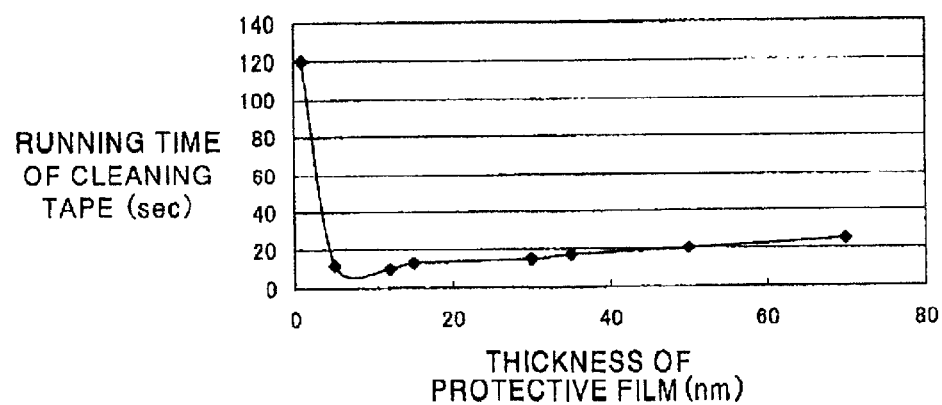
FIG. 11 is a graph of the relationship between a thickness of a carbon protective film and a cleaning effect when using particles having a diameter of 25±5 nm in the first embodiment.

FIG. 11 shows the results of an investigation of the relationship between the thickness of the carbon protective film and the cleaning effect when setting the thickness of the magnetic layer to 50 nm and setting the density of surface projections to $500 \times 10^4$ particles/mm$^2$. Based on the indicator of the cleaning time described above (20 seconds or less), it is found that an appropriate cleaning effect can be obtained with a thickness of the carbon protective film within a range of 3 nm to 50 nm.

Figure 12:
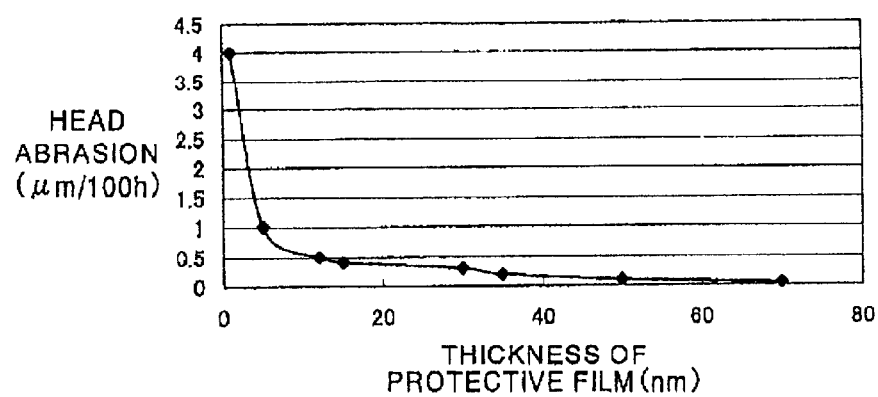
FIG. 12 is a graph of the relationship between a thickness of a carbon protective film and head abrasion when using particles having a diameter of 25±5 nm in the first embodiment.

FIG. 12 shows the results of an investigation of the relationship between the thickness of the carbon protective film and head abrasion when setting the thickness of the magnetic layer 3 to 50 nm and setting the density of surface projections to $500 \times 10^4$ particles/mm$^2$ in the same manner as FIG. 11. As shown in FIG. 12, the thicker the carbon protective film, the lower the head abrasion. It is found that the head abrasion with respect to the usage time of the cleaning tape becomes within the acceptable range described above (1 $\mu$m/100 h) when setting the thickness of the carbon protective film to 3 nm or more.

From FIGS. 11 and 12, it is found that the preferable thickness of the carbon protective film is within a range of 3 nm to 50 nm for achieving both a sufficient cleaning effect and low abrasion. When the thickness of the carbon protective film becomes outside of the range described above, the balance of the cleaning effect and low abrasion cannot be maintained well.

Next, the diameter of the particles 2 was changed to 15±5 nm and measurements performed under the same conditions as in FIGS. 5 to 8 described above. The cleaning effect, the acceptable range of head abrasion, etc. were judged in the same manner as the case of particles of 35±5 nm diameter described above. FIGS. 13 to 16 show the results of measurement when using particles having a diameter of 15±5 nm.

Figure 13:
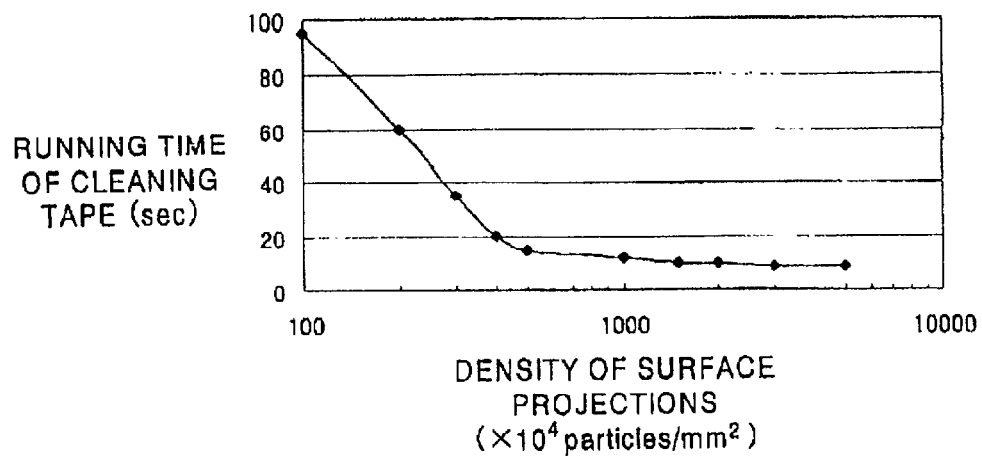
FIG. 13 is a graph of the relationship between the density of surface projections and the cleaning effect when using particles having a diameter of 15±5 nm in the first embodiment.

FIG. 13 shows the results of an investigation of the density of surface projections giving a sufficient cleaning effect when the thickness of the magnetic layer 3 is set to 50 nm and the thickness of the carbon protective film is set to 10 nm. Based on the indicator of the cleaning time described above (20 seconds or less), as shown in FIG. 13, a sufficient cleaning effect is obtained when the particle density is $400 \times 10^4$ particles/mm$^2$ or more.

Figure 14:
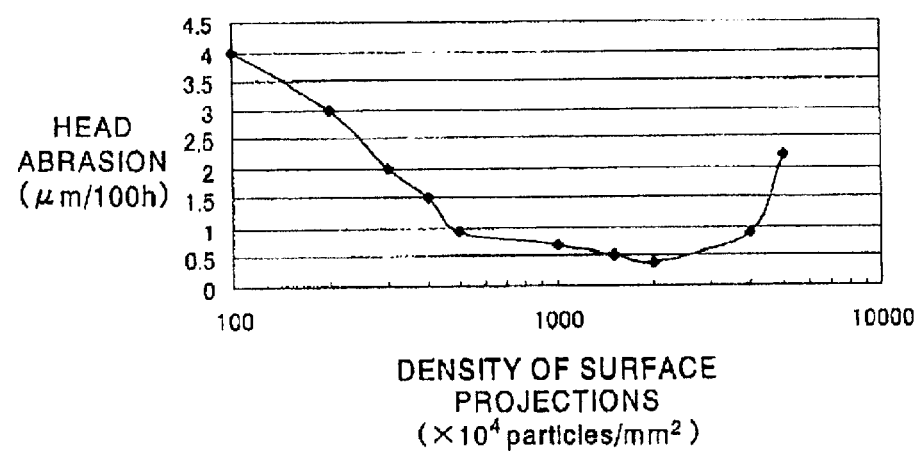
FIG. 14 is a graph of the relationship between the density of surface projections and head abrasion when using particles having a diameter of 15±5 nm in the first embodiment.

FIG. 14 shows the results of an investigation of the relationship between the density of surface projections and head abrasion when setting the thickness of the magnetic layer to 50 nm and setting the thickness of the carbon protective film to 10 nm in the same manner as FIG. 13. As shown in FIG. 14, when the density of particles is about $2000 \times 10^4$ particles/mm$^2$, the head abrasion becomes minimum. The lower the density of the particles from that range or the higher the density of the particles from that range, the more the head abrasion becomes. It is found that the head abrasion with respect to the usage time of the cleaning tape becomes within the acceptable range described above (1 $\mu$m/100 h) when setting the particle density to a range from $500 \times 10^4$ particles/mm$^2$ to $4000 \times 10^4$ particles/mm$^2$.

From FIGS. 13 and 14, it is found that the density of surface projections must be set to a range of $500 \times 10^4$ to $4000 \times 10^4$ particles/mm$^2$ for achieving both a sufficient cleaning effect and low abrasion. When the particle density becomes outside of the range described above, the balance of the cleaning effect and low abrasion cannot be maintained well.

Figure 15:
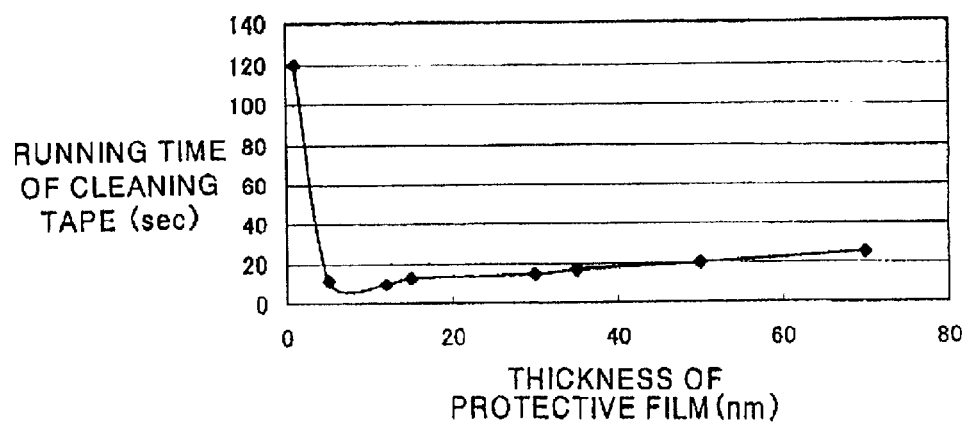
FIG. 15 is a graph of the relationship between the thickness of a carbon protective film and the cleaning effect when using particles having a diameter of 15±5 nm in the first embodiment.

FIG. 15 shows the results of an investigation of the relationship between the thickness of the carbon protective film and the cleaning effect when setting the thickness of the magnetic layer to 50 nm and setting the density of surface projections to $500 \times 10^4$ particles/mm$^2$. Based on the indicator of the cleaning time described above (20 seconds or less), it is found that an appropriate cleaning effect can be obtained with a thickness of the carbon protective film within a range of 3 nm to 50 nm.

Figure 16:
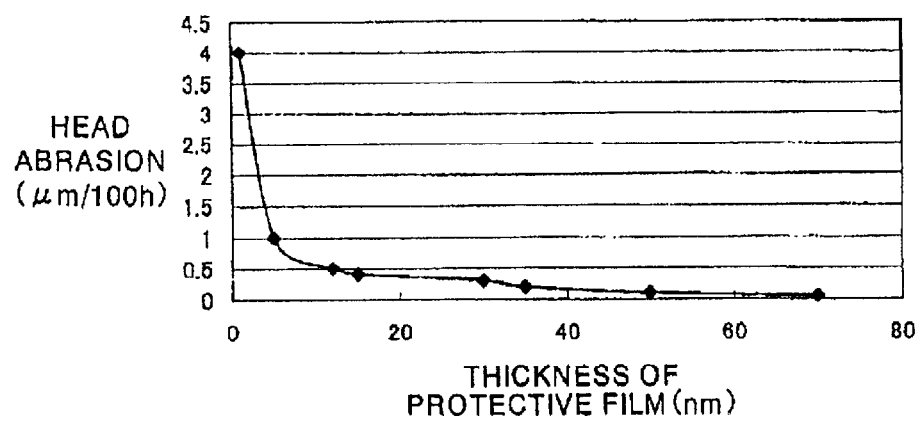
FIG. 16 is a graph of the relationship between the thickness of a carbon protective film and head abrasion when using particles having a diameter of 15±5 nm in the first embodiment.

FIG. 16 shows the results of an investigation of the relationship between the thickness of the carbon protective film and head abrasion when setting the thickness of the magnetic layer 3 to 50 nm and setting the density of surface projections to $500 \times 10^4$ particles/mm$^2$ in the same manner as FIG. 15. As shown in FIG. 16, the thicker the carbon protective film, the lower the head abrasion. It is found that the head abrasion with respect to using time of the cleaning tape becomes within an acceptable range described above (1 $\mu$m/100 h) when setting the thickness of the carbon protective film to 3 nm or more.

From FIGS. 15 and 16, it is found that the preferable thickness of the carbon protective film is within a range of 3 nm to 50 nm for achieving both a sufficient cleaning effect and low abrasion. When the thickness of the carbon protective film becomes outside of the range described above, the balance of the cleaning effect and low abrasion cannot be maintained well.

Figure 17:
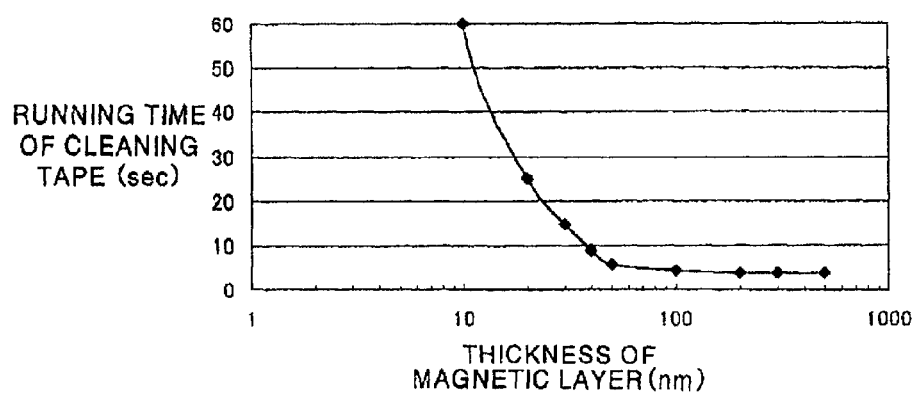
FIG. 17 is a graph of the relationship between the thickness of a magnetic layer and the cleaning effect in the first embodiment.

FIG. 17 shows the results of an investigation on a relationship between a thickness of the magnetic layer and a cleaning effect when using particles having a diameter of 35±5 nmm, setting the thickness of the carbon protective film to 10 nm, and setting the density of surface projections to $500 \times 10^4$ particles/mm$^2$. As shown in FIG. 17, when the magnetic layer is made thin, the cleaning effect sharply decreases. Based on the above indicator of the cleaning time (20 seconds or less), it is found that the thickness of the magnetic layer 3 has to be about 30 nm or more.

From FIG. 4 and FIG. 17, it is found that the electric resistivity of the cleaning tape is lowered, electrostatic discharge damage is prevented, and a sufficient cleaning effect is obtained when the thickness of the magnetic layer 3 is 30 nm or more.

As described above, when the diameter of the particles 2 is 35±5 nm, 25±5 nm, or 15±5 nm, it becomes possible to prevent electrostatic discharge damage of the magnetoresistive type head, suppress head abrasion, and obtain a sufficient cleaning effect by setting the surface projection density within predetermined ranges obtained from the above measurements.

Second Embodiment

The cleaning tape of the second embodiment has the same configuration as the cleaning tape of the first embodiment shown in FIG. 1 except that a magnetic or nonmagnetic electroconductive layer 3 is provided in place of the magnetic layer 3.

As the material of the electroconductive layer 3, for example, aluminum (Al), copper (Cu), tungsten (W), molybdenum (Mo), magnesium (Mg), iron (Fe), nickel (Ni), or an alloy of the same can be used. The volume resistivity at 0° C. is $2.5 \times 10^{-8}$ $\Omega \cdot m$ for Al, $1.6 \times 10^{-8}$ $\Omega \cdot m$ for Cu, $4.9 \times 10^{-8}$ $\Omega \cdot m$ for W, $5.0 \times 10^{-8}$ $\Omega \cdot m$ for Mo, $3.9 \times 10^{-8}$ $\Omega \cdot m$ for Mg, $8.9 \times 10^{-8}$ $\Omega \cdot m$ for Fe, and $6.2 \times 10^{-8}$ $\Omega \cdot m$ for Ni.

Therefore, particularly when using Al or Cu as the material of the electroconductive layer 3, the electroconductive layer 3 can be made thinner than the case of using other metals. Also, since Al and Cu are especially low in electric resistivity, they are advantageous for lowering the electric resistivity of the surface of the cleaning tape and preventing electrostatic discharge damage of the head.

The electroconductive layer 3 can be formed by the same method as the magnetic layer in the cleaning tape of the first embodiment such as vacuum evaporation, sputtering, ion plating, or other PVD. Alternatively, CVD can also be employed.

Below, characteristics of the cleaning tape of the second embodiment will be explained with reference to measurement results. In the examples below, a PET film was used as the nonmagnetic base film 1, an Al layer was formed as the electroconductive layer 3 by vacuum evaporation, and a top coating layer 5 and back coating layer 7 were provided on the cleaning tape.

Figure 18:
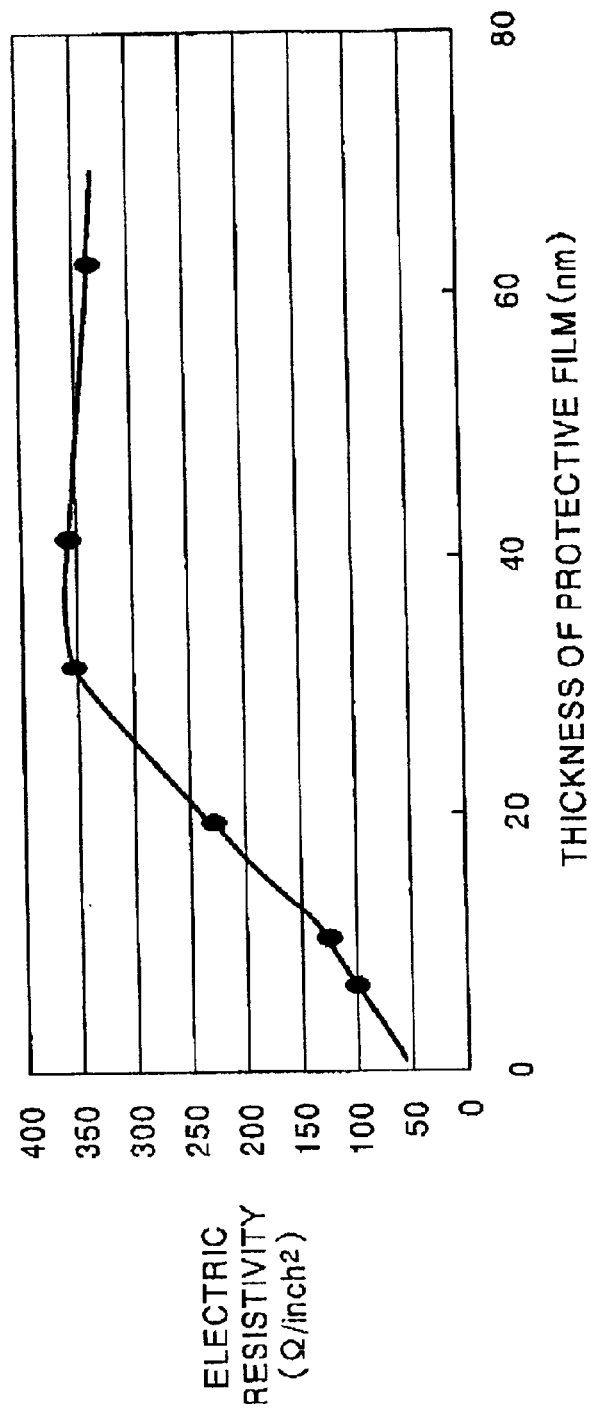
FIG. 18 is a graph of the relationship between the thickness of a carbon protective film and electric resistivity in the second embodiment.

FIG. 18 shows the results of measurement of the thickness of a carbon protective film provided as the inorganic protective film 4 and the electric resistivity on the surface of the cleaning tape. When setting the thickness of the magnetic layer 3 to 150 nm and changing the thickness of the carbon protective film, the electric resistivity becomes maximum at a 35 nm thickness of the carbon protective film.

Figure 19:
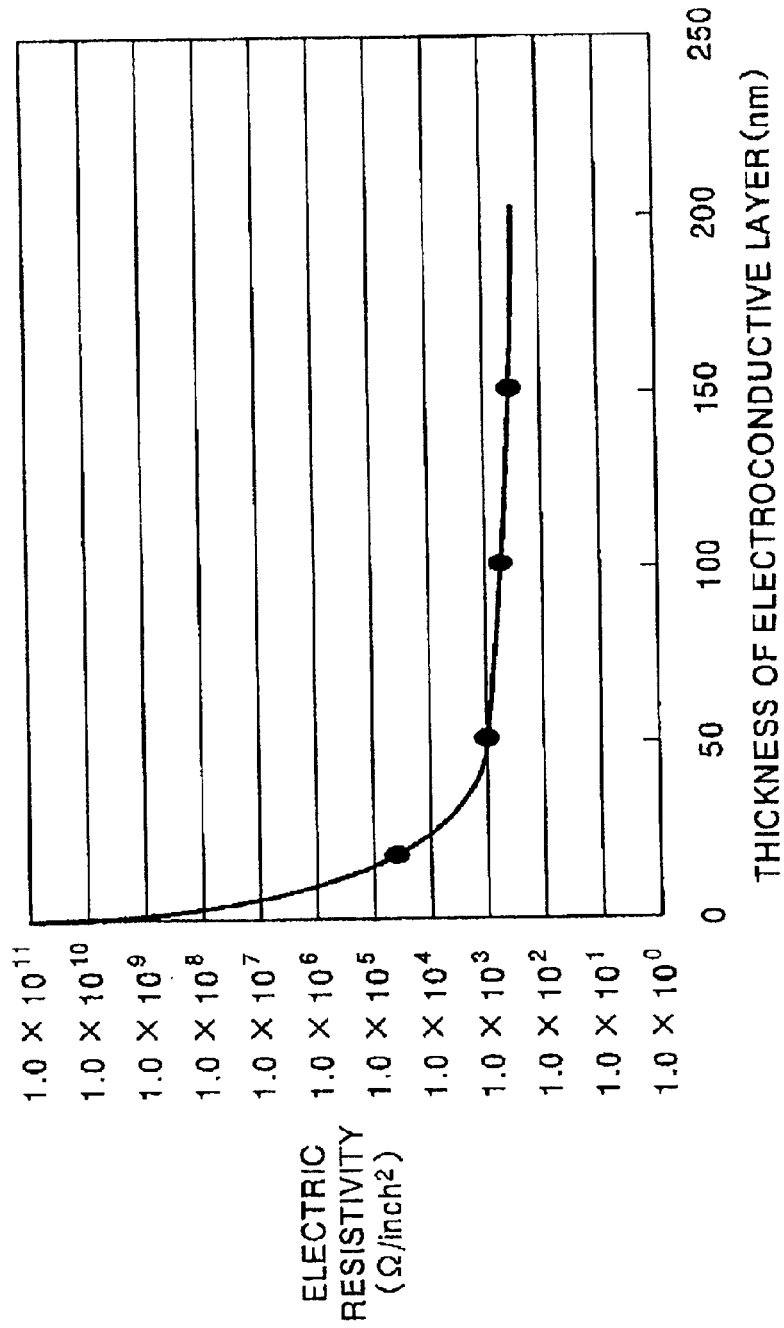
FIG. 19 is a graph of the relationship between the thickness of a nonmagnetic metal layer and electric resistivity in the second embodiment.

FIG. 19 shows the result of measurement of the electric resistivity at the above thickness of the carbon protective film (35 nm) when changing the thickness of the electroconductive layer 3. As shown in FIG. 19, the thicker the electroconductive layer 3, the lower the electric resistivity. When the electroconductive layer 3 becomes thinner than about 20 nm, the electric resistivity sharply increases. When the thickness of the electroconductive layer 3 is 0 nm, that is, when only the PET film is provided, the electric resistivity becomes $1 \times 10^{11}$ $\Omega/inch^2$ or more. Therefore, it is found that about 20 nm or more is required for the thickness of the electroconductive layer for preventing electrostatic discharge damage of the magnetoresistive head when the thickness of the carbon protective film (35 nm) is one giving the maximum electric resistivity.

Figure 20:
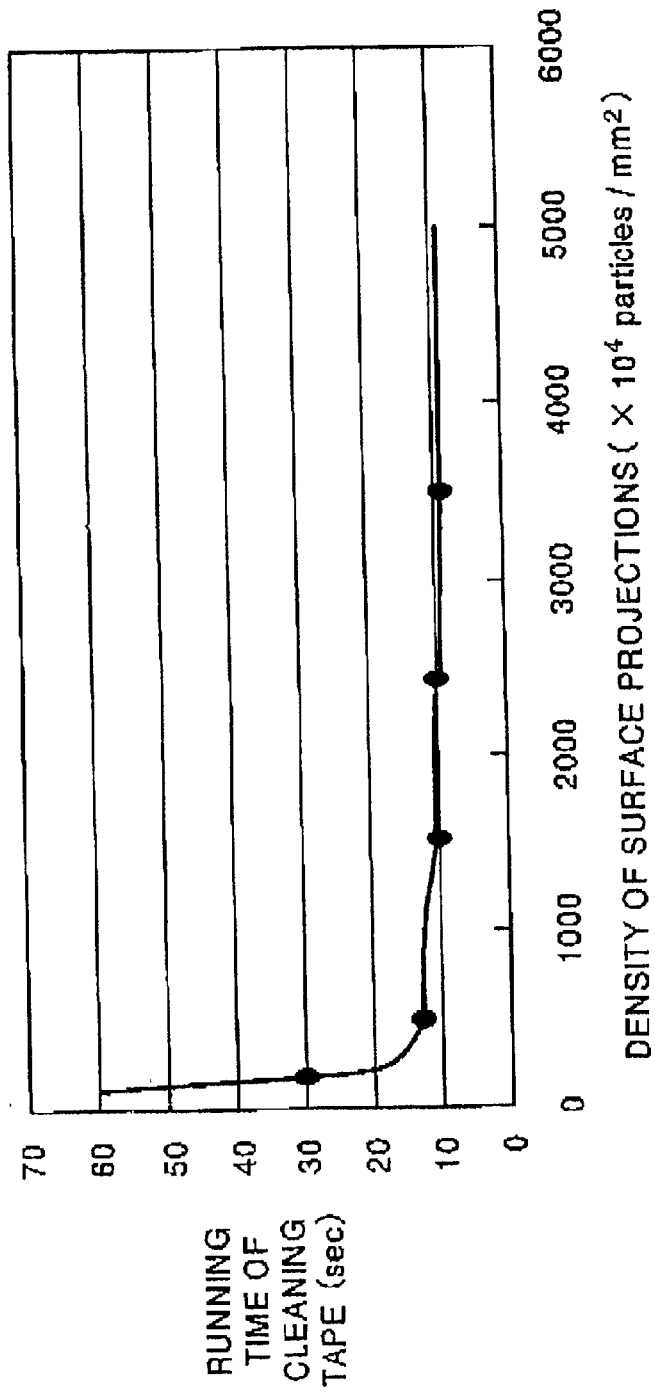
FIG. 20 is a graph of the relationship between the density of surface projections and the cleaning effect in the second embodiment.

FIG. 20 shows the results of an investigation of the density of surface projections giving a sufficient cleaning effect when the thickness of the electroconductive layer 3 is set to 50 nm and the thickness of the carbon protective film is set to 10 nm. Particles 2 having a diameter of 25±5 nm were arranged on the nonmagnetic base film 1 to form the projections on the surface of the electroconductive layer 3. The cleaning effect was judged in the same manner as the first embodiment.

As shown in FIG. 20, when the density of the particles is $200 \times 10^4$ particles/mm$^2$ or more, the cleaning time is 20 seconds or less, so that the cleaning tape can be regarded as usable. On the other hand, when the density of the particles exceeds $2000 \times 10^4$ particles/mm$^2$, the cleaning time becomes extremely short. If the optimum cleaning time becomes too short, control of the cleaning time becomes difficult and the possibility of excess cleaning arises. Therefore, according to FIG. 20, it is found that the preferable density of the particles is about $200 \times 10^4$ particles/mm$^2$ to $2000 \times 10^4$ particles/mm$^2$.

Figure 21:
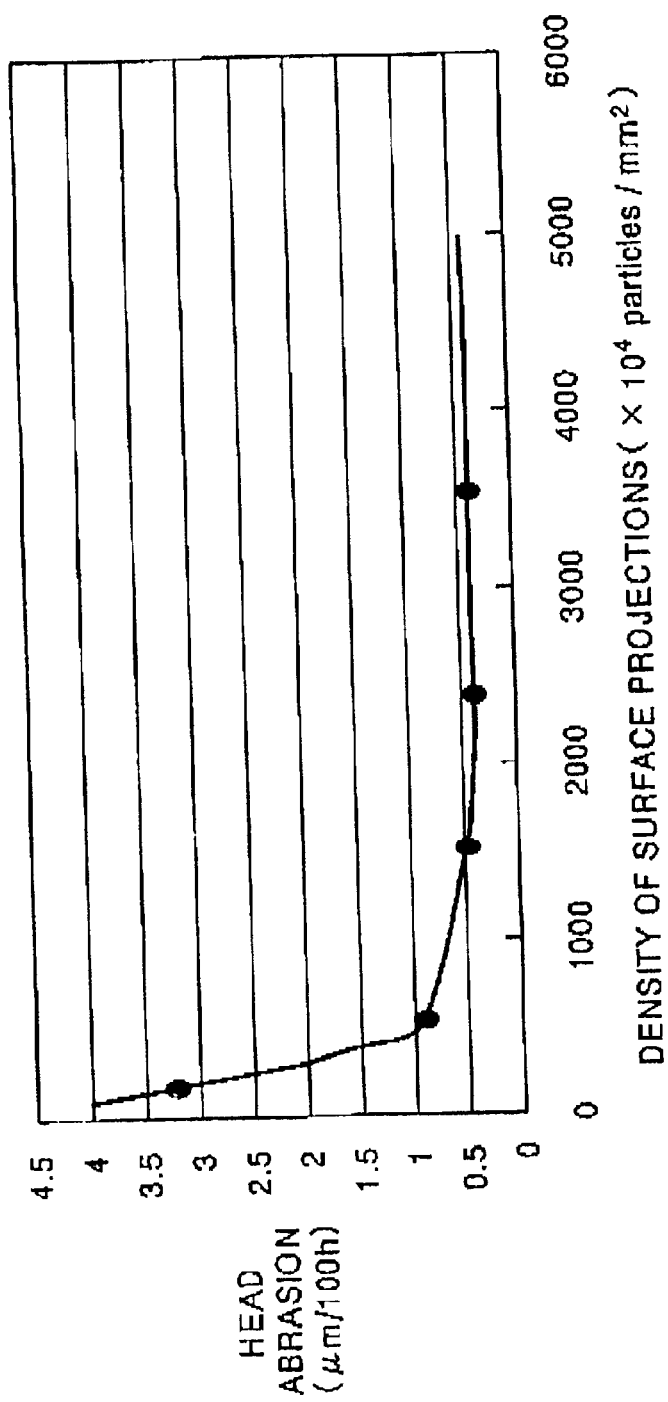
FIG. 21 is a graph of the relationship between the density of surface projections and head abrasion in the second embodiment.

FIG. 21 shows the results of an investigation of the relationship between the density of surface projections and head abrasion when setting the thickness of the magnetic layer to 50 nm and setting the thickness of the carbon protective film to 10 nm in the same manner as FIG. 20. As shown in FIG. 21, the higher the particle density, the less the head abrasion. It is found that the head abrasion with respect to usage time of the cleaning tape becomes within the acceptable range described above (1 $\mu$m/100 h) when setting the particle density to $500 \times 10^4$ particles/mm$^2$ or more.

From FIGS. 20 and 21, it is found that the density of surface projections must be set within the range of $500 \times 10^4$ to $2000 \times 10^4$ particles/mm$^2$ for achieving both a sufficient cleaning effect and low abrasion. When the particle density becomes outside of the range described above, the balance of the cleaning effect and low abrasion cannot be maintained well.

Figure 22:
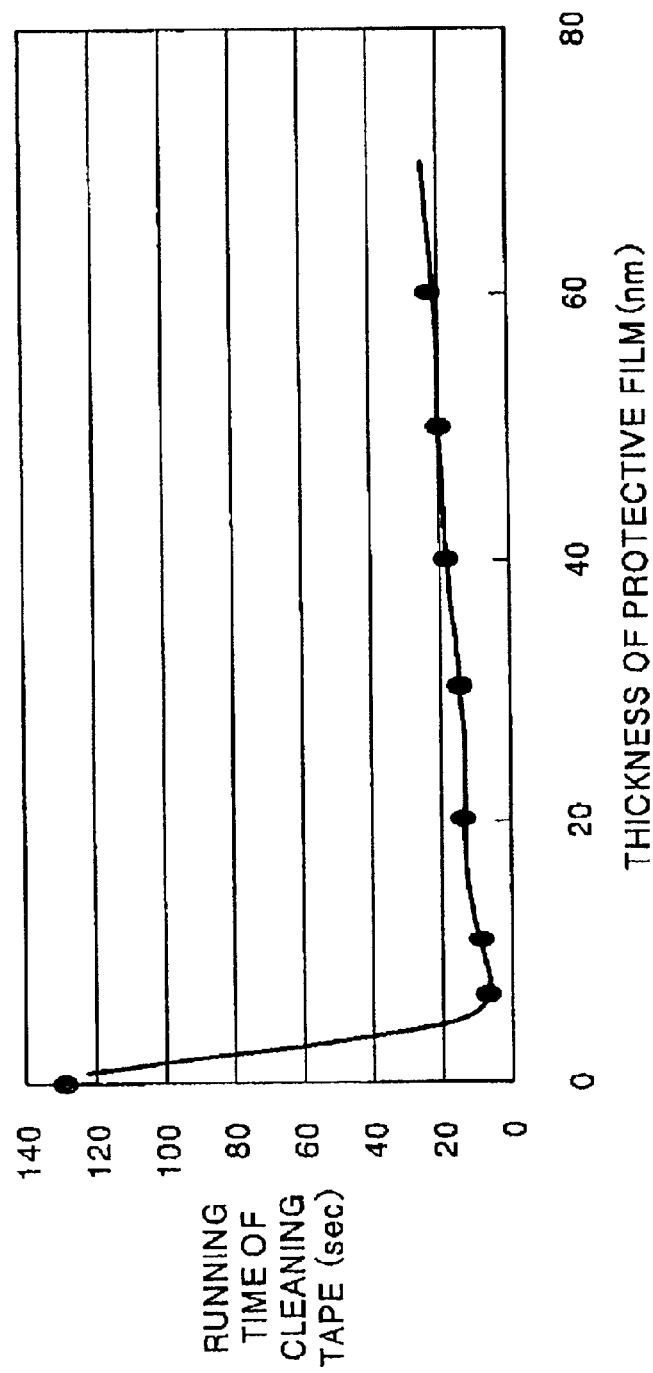
FIG. 22 is a graph of the relationship between the thickness of a carbon protective film and the cleaning effect in the second embodiment.

FIG. 22 shows the results of an investigation of the relationship between the thickness of the carbon protective film and the cleaning effect when setting the thickness of the electroconductive layer to 50 nm and setting the density of surface projections to $500 \times 10^4$ particles/mm$^2$. Based on the indicator of the cleaning time described above (20 seconds or less), it is found that an appropriate cleaning effect can be obtained with a thickness of the carbon protective film within a range of 3 nm to 50 nm.

FIG. 23 shows the results of an investigation of the relationship between the thickness of the carbon protective film and head abrasion when setting the thickness of the electroconductive layer 3 to 50 nm and setting the density of surface projections to $500 \times 10^4$ particles/mm$^2$ in the same manner as FIG. 22. As shown in FIG. 23, the thicker the carbon protective film, the lower the head abrasion. It is found that the head abrasion with respect to usage time of the cleaning tape becomes within the acceptable range described above (1 $\mu$m/100 h) when setting the thickness of the carbon protective film to 3 nm or more.

From FIGS. 22 and 23, it is found that the preferable thickness of the carbon protective film is within a range from 3 nm to 50 nm for achieving both a sufficient cleaning effect and low abrasion. When the thickness of the carbon protective film becomes outside of the range described above, the balance of the cleaning effect and low abrasion cannot be maintained well.

When forming a Cu layer by vacuum evaporation in place of the Al layer as the electroconductive layer 3 and performing the above experiments, similar results were obtained.

On the other hand, when forming a W layer, Mo layer, Mg layer, Fe layer, or Ni layer in place of the Al layer as the electroconductive layer and performing the above experiments, similar results were obtained only for the density of surface projections and thickness of the carbon protective film.

However, these metals have a higher resistivity than Al or Cu. Therefore, the thickness of the electroconductive layer comprised of those metals had to be made about 30 nm or more for making the electric resistivity $1\times10^6$ $\Omega/\text{inch}^2$ or less when the thickness of the carbon protective film (about 35 nm) was one giving the maximum electric resistivity.

As described above, when the diameter of the particle 2 is 25±5 nm, it becomes possible to prevent electrostatic discharge damage of the magnetoresistive type head, suppress head abrasion, and obtain a sufficient cleaning effect by setting the density of the surface projections within a predetermined range ($500\times10^4$ to $2000\times10^4$ particles/mm$^2$) obtained from the above measurements.

Also, according to the cleaning tape of the present embodiment, by forming the Al layer, Cu layer, or other metal layer by vacuum evaporation etc., it is possible to lower the electric resistivity and suppress the material cost compared to providing a magnetic layer in a cleaning tape by the same method.

Summarizing the effects of the invention, according to the present invention, it is possible to obtain a cleaning tape preventing generation of static electricity due to a low electric resistivity, making head abrasion low, and giving a sufficient cleaning effect, particularly having an effect of preventing electrostatic discharge damage to a magnetoresistive type head.

While the invention has been described with reference to specific embodiment chosen for purpose of illustration, it should be apparent that numerous modifications could be made thereto by those skilled in the art without departing from the basic concept and scope of the invention.

What is claimed is:

1. A cleaning tape comprising:
   a nonmagnetic base film;
   an evaporated metal layer formed on the nonmagnetic base film;
   an inorganic protective film formed on the evaporated metal layer;
   a top coating layer formed on the entire inorganic protective film; and
   particles effectively disposed in said inorganic protective film to create surface projections, said surface projections varying in accordance with the diameter and density of the particles.

2. A cleaning tape as set forth in claim 1, wherein the evaporated metal layer is an alloy magnetic layer mainly composed of cobalt, and the thickness of the alloy magnetic layer is about 30 nm or more.

3. A cleaning tape as set forth in claim 2, wherein said surface projections formed on the nonmagnetic base film by said particles having a diameter of 35±5 nm and a density of about $300\times10^4$ to $1500\times10^4$ particles/mm$^2$.

4. A cleaning tape as set forth in claim 2, wherein said surface projections formed on the nonmagnetic base film by said particles having a diameter of 25±5 nm and a density of about $500\times10^4$ to $2000\times10^4$ particles/mm$^2$.

5. A cleaning tape as set forth in claim 2, wherein said surface projections formed on the nonmagnetic base film by said particles having a diameter of 15±5 nm and a density of about $500\times10^4$ to $4000\times10^4$ particles/mm$^2$.

6. A cleaning tape as set forth in claim 1, wherein the evaporated metal layer is an electroconductive layer.

7. A cleaning tape as set forth in claim 6, wherein the electroconductive layer comprises a nonmagnetic layer.

8. A cleaning tape as set forth in claim 6, wherein said surface projections formed on the nonmagnetic base film by said particles having a diameter of 25±5 nm and a density of about $500\times10^4$ to $2000\times10^4$ particles/mm$^2$.

9. A cleaning tape as set forth in claim 6, wherein the electroconductive layer is a metal layer or alloy layer comprising at least one of aluminum or copper.

10. A cleaning tape as set forth in claim 9, wherein the thickness of the electroconductive layer is about 20 nm or more.

11. A cleaning tape as set forth in claim 6, wherein the electroconductive layer is a metal layer or alloy layer comprising at least one of tungsten, molybdenum, magnesium, iron, and nickel.

12. A cleaning tape as set forth in claim 11, wherein the thickness of the electroconductive layer is about 30 nm or more.

13. A cleaning tape as set forth in claim 1, wherein the inorganic protective film comprises a carbon protective film.

14. A cleaning tape as set forth in claim 1, wherein a thickness of the inorganic protective film is about 3 nm to 50 nm.

15. A cleaning tape comprising:
   a back coating layer;
   a nonmagnetic base film;
   an evaporated metal layer formed on the nonmagnetic base film;
   an inorganic protective film formed on the evaporated metal layer;
   a top coating layer; and
   particles effectively disposed in said inorganic protective film to create surface projections, said surface projections varying in accordance with the diameter and density of the particles.

16. A cleaning tape as set forth in claim 15, wherein the evaporated metal layer is an alloy magnetic layer mainly composed of cobalt, and the thickness of the alloy magnetic layer is about 30 nm or more.

17. A cleaning tape as set forth in claim 16, wherein said surface projections formed on the nonmagnetic base film by said particles having a diameter of 35±5 nm and a density of about $300\times10^4$ to $1500\times10^4$ particles/mm$^2$.

18. A cleaning tape as set forth in claim 16, wherein said surface projections formed on the nonmagnetic base film by said particles having a diameter of 25±5 nm and a density of about $500\times10^4$ to $2000\times10^4$ particles/mm$^2$.

19. A cleaning tape as set forth in claim 16, wherein said surface projections formed on the nonmagnetic base film by said particles having a diameter of 15±5 nm and a density of about $500\times10^4$ to $4000\times10^4$ particles/mm$^2$.

20. A cleaning tape as set forth in claim 15, wherein the evaporated metal layer is an electroconductive layer.

21. A cleaning tape as set forth in claim 20, wherein electroconductive layer comprises a nonmagnetic layer.

22. A cleaning tape as set forth in claim 20, wherein said surface projections formed on the nonmagnetic base film by said particles having a diameter of 25±5 nm and a density of about $500\times10^4$ to $2000\times10^4$ particles/mm$^2$.

23. A cleaning tape as set forth in claim 20, wherein the electroconductive layer is a metal layer or alloy layer comprising at least one of aluminum or copper.

24. A cleaning tape as set forth in claim 23, wherein the thickness of the electroconductive layer is about 20 nm or more.

25. A cleaning tape as set forth in claim 20, wherein the electroconductive layer is a metal layer or alloy layer comprising at least one of tungsten, molybdenum, magnesium, iron, and nickel.

26. A cleaning tape as set forth in claim 25, wherein the thickness of the electroconductive layer is about 30 nm or more.

27. A cleaning tape as set forth in claim 15, wherein the inorganic protective film comprises a carbon protective film.

28. A cleaning tape as set forth in claim 15, wherein a thickness of the inorganic protective film is about 3 nm to 50 nm.

* * * * *